Patented June 10, 1952

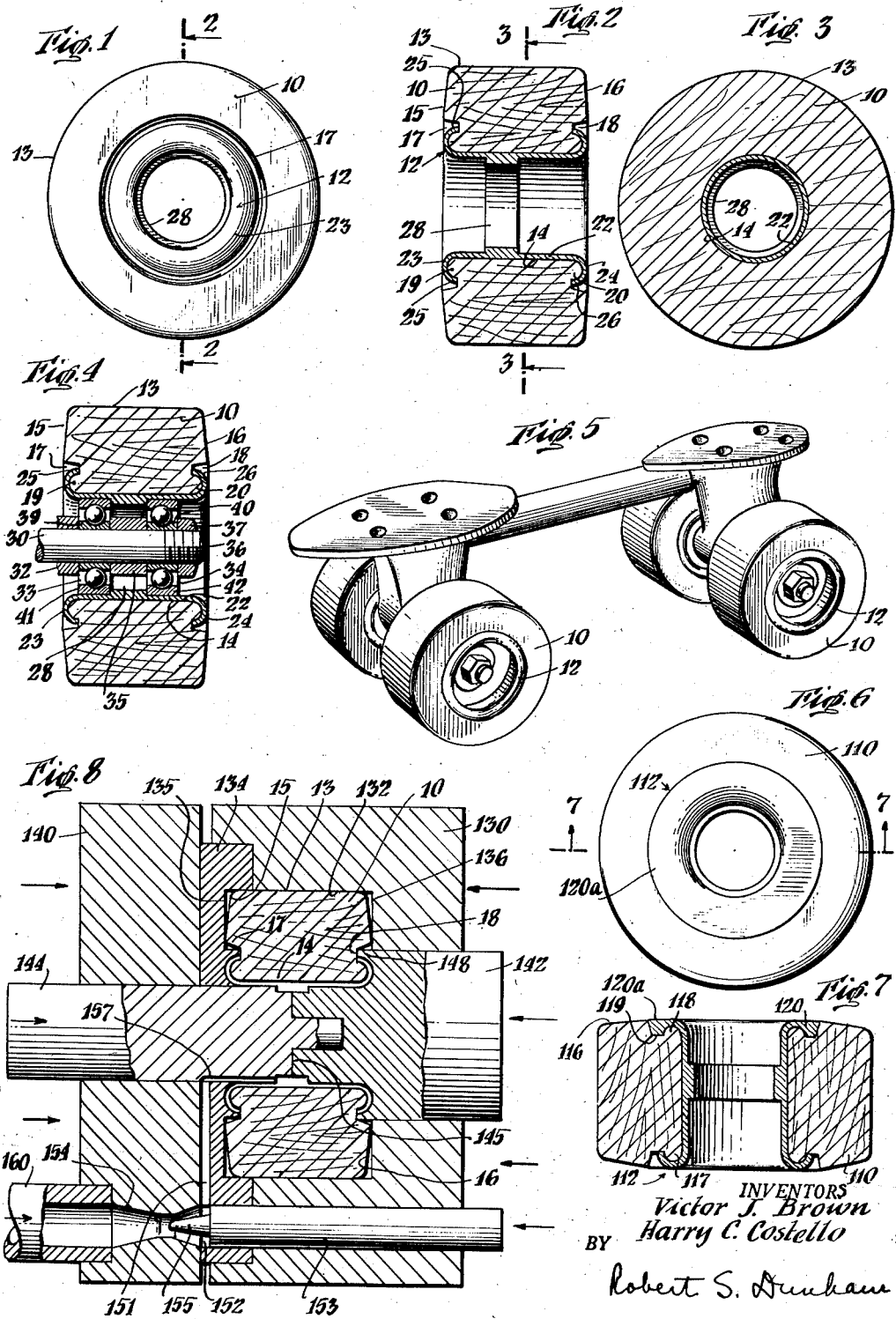

UNITED STATES PATENT OFFICE 2,599,540

SKATE WHEEL

Victor J. Brown, Newark, N. J., and Harry C. Costello, Massapequa, N. Y.

Application May 28, 1949, Serial No. 95,998

3 Claims. (Cl. 301—5.7)

This invention relates to skate wheels, and more particularly to wheels for roller skates of the rink or indoor type. As commonly made such wheels consist of an annular wooden body or tread cut from hard wood, and a central bushing arrangement which traverses the body and is intended to fit the usual bearings on which the wheel is rotatably mounted. To support the wheels, the customary skate truck assembly includes shaft portions projecting laterally at each side in the front and rear, upon each of which the ball bearings are assembled and held by their inner races, in such way that the outer races engage and hold the bushing of the wheel.

Skate wheels of this character must not only satisfy high standards of precision, to be perfectly true in centering and in cylindrical outer contour, but should be unusually rugged, to withstand the severe conditions of use. In modern practice of the art of skating, involving high speeds and the rapid execution of various steps, turns and figures, skate wheels are constantly subjected to an infinite variety of shocks, stresses and strains, exerted in almost all conceivable directions. Despite great care in their manufacture, breakage of such wheels, i. e. the wooden bodies, has been a common occurrence, as well as loosening of the wooden portion relative to its mounting or bearing structure in one way or another. At the very least, replacement of broken wheels has become a serious burden and expense to persons pursuing this pastime, present experience being that even moderately expert skaters may expect to have one or more skate wheels break during a single session. Even incipient loosening of the wheel body on its bushing is not to be tolerated, for either safety or effectiveness in use of the skates.

To prevent loosening or other mis-alignment of the wooden wheel body on the bushing or sleeve assembly by which the wheel is seated on the bearings, a wide variety of structures have been heretofore proposed, such as tubular members forcibly deformed or upset at their ends to grip the end faces of the wheel body, or bushings having end flanges with pins or screws penetrating the body, or plural assemblies such as coaxial tubular parts threaded so as to be screwed together from opposite ends of the wheel opening. Still another proposal has been to cast locking ribs of low-melting, fusible metal in mating grooves formed in the facing cylindrical surfaces of the wheel opening and an inserted, tubular bushing. Experience indicates, however, that none of these proposals has effectively solved the problem of preventing loosening or other mishap under the rigorous conditions of service, at least by using any structure which can be manufactured without inordinate expense as for elaborate, individual machining, fitting and finishing of complex and usually cumbersome assemblies.

Indeed, it has now been found that even with the best and most carefully made structures now available, failures and accidents occur very frequently. It appears, in fact, that in the course of a relatively short time of use the wheel body tends to loosen relative to the bushing, or the bushing to become distorted relative to its enclosed bearings, with the apparent result that sooner or later a sudden shock or twist or other distorting force on the wheel finds a locality of uneven or imperfect support and cracks or breaks the wheel body.

An important object of the present invention is to provide a new and improved skate wheel, wherein the wheel body is effectively secured and supported, with far less danger of breakage or other mishap than has heretofore customarily been achieved. A further object of the invention is to provide a skate wheel structure wherein the wooden body portion is mounted and firmly held by a bushing device in a relatively permanent manner, yet permitting a perfectly true and centered relation between the inside of the bushing and the exterior of the wheel and likewise an accurately predetermined fit of the bushing with respect to the surrounded ball bearing races or the like, uniformity and accuracy in the last-mentioned respect being seldom attained in assemblies heretofore made.

Other objects of the invention are to afford a novel and particularly rugged skate wheel construction which may be manufactured at a relatively small cost and yet with unusual precision of shape and dimensions and equally unusual uniformity of the product in such respects.

To these and other ends the present invention is grounded upon the discovery that a perfectly practical and remarkably effective structure may be provided by the combination of a rigid, wooden wheel body with a bushing member which has been pressure-cast in place in the opening of the wheel body, effectively lining the same in completely intimate contact with the inner surface of the opening. A further and particular feature of the invention resides in the structure of the bushing as related to the associated wheel body, in providing a compressive engagement in such fashion as to hold the bushing and wheel together by positive, continuing force exerted, not at localized points but throughout continuous surface portions of the body and most preferably by engagement of the latter in such regions and directions as afford the least possible tendency of the wheel body element or any part of it to crack, break or yield improperly to the compressive grip of the bushing. A peculiarly advantageous structure, carrying out the broader principles of the invention and also embodying features of preferred and especially significant value, comprises the combination of a hard wood wheel body, shaped with its grain generally parallel to the axis of rotation, and a bushing of metal pressure-cast in place to constitute a relatively thin tubular structure lining the central opening of the wheel with perfect intimacy, and at its ends overlying and turning outwardly and rearwardly in conformity with an annular bead or groove configuration shaped or formed around the face of the wheel, the pressure-cast body of metal exerting, in its completed state, a strong compressive grip, especially between its flanges and also preferably in, and against the sides of, the described configuration of the wheel faces. As more fully explained below, mounted wheels constructed in accordance with these principles have been found to be very durable, and remarkably free from breakage, cracking, or loosening even under hard service.

By way of example, certain embodiments of the invention, together with arrangements illustrative of one manner of making it, are shown in the accompanying drawings and described hereinbelow.

Referring to the drawings:

Fig. 1 is an elevation of a wheel structure embodying the invention;

Fig. 2 is a vertical section on line 2—2 of Fig. 1;

Fig. 3 is a vertical section on line 3—3 of Fig. 2;

Fig. 4 is a vertical section, taken as if on the line 2—2 of Fig. 1, but in the other direction and illustrating the complete wheel as assembled on the shaft of a skate truck;

Fig. 5 is a simplified perspective view of a complete skate incorporating wheels of the present invention;

Fig. 6 is an elevation of another embodiment of the invention;

Fig. 7 is a vertical section on line 7—7 of Fig. 6;

Fig. 8 is a view in vertical section and in somewhat simplified form of one type of die casting apparatus suitable for use in manufacturing structures of the invention.

As shown in Figs. 1 to 4 inclusive, the improved wheel structure comprises a wheel body portion 10 and a bushing structure 12 intimately associated therewith. Although the portion 10 may for some purposes be made in other specific ways and shapes, the illustrated element consists of a rigid, unitary body shaped, in the form of a wheel, from a single piece of hard wood, maple being particularly perferred, having the grain of the wood running parallel or substantially parallel to the wheel axis. In the specific wheel shown, the body 10 is a solid of revolution described by revolving a plane figure having essentially the shape of a rectangle, around an axis parallel to and spaced from a longer side of such rectangle, the described solid having a cylindrical outer surface 13, to bear on the floor, and a cylindrical, central opening 14 substantially coaxial therewith, indeed by preference accurately so. The wheel body also has essentially plane end faces 15, 16 generally or approximately perpendicular to the axis and rounded, as shown, at the outer edges, around the surface 13.

The end faces 15, 16 also have annular grooves 17, 18 shaped in them respectively, in concentric relation to the central opening 14 and spaced radially from the latter by a distance small but sufficient to provide corresponding annular beads 19, 20 around the opening. In the structure shown, such beads are of a rounded or curved contour and may have their outer surfaces or summits slightly recessed from the general plane of the faces 15, 16.

The bushing structure 14 consists of a single, integral body of metal, of relatively hard and durable composition, which is pressure-cast in place in the exact configuration desired, i. e. not only in exact and intimate conformity with the enveloped surfaces of the wheel body but preferably also in the precise shape and size required for the other or exposed surfaces of the bushing. The bushing 12 thus comprises a tubular, cylindrical portion 22, engaging the entire inner surface of the opening 14 and having at its ends outwardly extending flanges generally designated 23, 24 which overlap and compressively engage the wheel faces 15, 16. In the specifically illustrated device the flanges also include rims or skirts 25, 26, of like annular shape, which extend rearwardly, i. e. back over, but spaced from, the tubular part 22. The flange structures thus precisely conform with the bead or groove arrangement on each end of the wheel, the edges of the shallow skirt portions 25, 26 engaging the bottoms of the grooves 17, 18 in compressive relation while the inner surface of each curved flange grips the central or inner side of the groove.

For use with conventional ball bearing structure, the inner surface of the tubular part 22 may be smoothly cylindrical, and is precisely coaxial with the outer surface 13 of the wheel body. Means for endwise abutting the outer races of the bearings or otherwise holding the wheel assembly against lateral displacement or thrust, may be fashioned integrally with the bushing 12. While spaced lugs or the like may in some cases be cast on the inner surface of the tubular part 22, the drawings show, for example, a particularly convenient structure embodying a stop ring or annular rib 28 cast as part of the bushing and projecting inwardly from its cylindrical inner surface at an intermediate locality suitable for the desired mounting on the skate bearings.

By extensive tests, skate wheels embodying the invention and made, for instance, essentially as shown in Figs. 1 to 4 inclusive, have been found thoroughly satisfactory. More particularly, even after many sessions of hard skating, under conditions where repeated breakage of the wooden bodies of previously available wheels (i e. breakage of successively substituted wheels) has been certain to occur, the present wheels remained intact, firm and thoroughly secure, without a trace of loosening, slippage, distortion or mis-alignment between the wheel body and its mounting, i. e. the bushing 12.

Although the invention is not limited to any particular theory or understanding as to the reason for the results achieved, it is at present believed that the bushing structure, being in fact bonded intimately and directly to the wheel body throughout the inner surface of the opening 14, constitutes a positive and fully distributed support for such body leaving no gaps, crevices or unsupported areas and thus permitting no uneven or unequal localization of strains and stresses. It is also believed that the continuing and completely distributed compressive force of the bushing structure may contribute materially to the rugged and mechanically coherent nature of the wheel unit. Thus the illustrated pressure-cast bushing, as by slight but effective shrinkage of the metal upon cooling, exerts powerful forces of compression on the wooden wheel body, for example particularly between the end flanges 23, 24 which thereby grip the corresponding annular portion of the body between them with unyielding force. It is believed that the edges of the skirts 25, 26 similarly tend to bite into the bottoms of the grooves 17, 18 while the skirts themselves, under the shrinkage of the metal, exert a corresponding compressive or pinching effect across the beads 19, 20 at all localities, thus providing compression between the skirts 25, 26 and the tubular part 22 of the bushing.

It is particularly to be noted that the several forces of compression, unlike the localized or uneven grips characteristic of mechanically deformed elements, are smoothly and uniformly distributed throughout those surfaces or edges of the bushing which exert such forces. Moreover, by virtue of the die cast nature of the device, there is no tendency for the tubular part 22 to move away from the inner surface of the opening 14 (indeed it adheres as if stuck by a powerful adhesive), while any shrinkage in the thickness dimension of the tube can be no more than microscopic (and negligible compared to the shrinkage along the axis or radially of the flanges) and is indeed believed to be compensated by the compressive forces elsewhere exerted or by the pressure under which the casting is made and chilled. It is believed that in this or like ways, the cast metallic bushing sets up terrific pressure on the wooden wheel body, holding the wood in all directions as though under heavy, continuing and uniformly distributed clamping pressure. In any event, the effective bonding and secure attachment between the bushing and the wheel structure are well demonstrated by the operating characteristics, i. e. in that the wheel body simply does not loosen relative to the bushing, or crack or break by reason of any defect in the attachment of the bushing to the wheel, even under severe service.

As indicated above, the bushing is preferably contoured on its exposed inner surface to precise dimensions and position, exact concentricity of such surface with the outer, bearing face 13 of the wheel being advantageously achieved in the single die casting operation by which the bushing is formed and attached.

Fig. 4 shows, by way of example, one way in which the wheel can be mounted on the truck of a skate, i. e. on a shaft 30 which extends from the truck frame or shaft support 32 at one side of the wheel location. It will be understood that the skate truck structure itself may be of conventional construction and is therefore not shown in detail. Mounted on the shaft 30 are two ball bearing assemblies 33, 34, separated by a spacer or sleeve 35 having a width or axial extent equal to that of the spacing stop 28 of the bushing. The outer end of the shaft 30 is threaded at 36 to receive a nut 37 which may be tightened down to lock the bearing assembly securely on the shaft, the inner races 39, 40 of the ball bearings being thus held between the nut 37 and the structure 32, with the spacer 35 between them. The outer races 41, 42 of the ball bearings are in consequence held against the respectively opposite faces of the bushing rib 28. So seated on the bearings, the wheel assembly is effectively mounted for free rotation about the shaft 36.

The arrangement is also preferably such that the end of the shaft 36 and the nut 37 are in effect recessed (as shown) in the opening of the bushing, i. e. so that the outer end of the shaft and nut assembly is below the plane of the wheel face 16. This arrangement prevents nicking or other damage to the wheels of the other skate, such as might occur when the skater happens to strike one skate against the other in the course of use. Fig. 5 shows four (4) wheels of the present character mounted on a skate truck, thus constituting a complete roller skate of improved, safer and more secure construction.

Figs. 6 and 7 illustrate another form of the invention, wherein the wheel body 110, bushing 112, beads 117 and 118 and other parts are generally similar to correspondingly numbered elements in Figs. 1 to 4 inclusive. Figs. 6 and 7 illustrate a somewhat different construction of the end flange of the bushing, for example, at one face 116 of the wheel. Instead of the bushing flange 120 simply constituting a layer of metal embracing the bead 118 with an outer surface of similar configuration, the bushing metal is here pressure-cast to fill the groove 119 fully, e. g. to a surface 120a flush with the outer face 116 of the wheel body. This arrangement has also been found advantageous, both for ease of manufacture and effectiveness of grip between the bushing and the wheel body. Indeed, the intimate engagement and compressive relationships hereinabove described with respect to Figs. 1 to 4 inclusive are similarly believed to characterize the structure of Figs. 6 and 7.

It may here be noted that in all of the illustrated embodiments of the invention, the metal of the bushing not only closely engages the abutting surfaces of the wooden body 110 at all points, but actually appears to penetrate the minute surface irregularities or interstices in the wood, in that no forcible cleaving operation (attempted for purposes of test) has been successful in separating even any substantial portion of the bushing from the wooden surface which the latter abuts. It is also to be noted that the compressive force exerted between the flanges 23, 24 is chiefly directed endwise of the grain of the wood, whereby the latter exhibits a maximum of resilience and a minimum tendency to assume a permanent set or deformity and thus to become loose, under the flanges. Similarly since the wood fibers run lengthwise into the beads 19, 20, affording a high strength for the beads against their being broken off radially of the wheel, the pinching or gripping effect of the curled-over parts 25, 26, of the bushing flanges is believed to be peculiarly secure against fracture or loosening of the beads or other part of the wooden body.

While the devices herein disclosed may be made in other ways, opportunity is taken in Fig. 8 to illustrate, in a simplified manner, one specific form of apparatus and of casting operation found effective for pressure-casting the bushing in place in and against the wheel body.

In Fig. 8, a die block 130 having a recess 131 with a cylindrical wall 132 exactly fitting the outer surface 13 of a wooden wheel body 10 which may be inserted in such recess, is arranged to be closed by a removable plate 134 seating in a cooperating shallow recess of the block 130 and providing an inner face 135 to abut a corresponding face 15 of the inserted wheel, the bottom 136 of the recess 131 similarly abutting the opposite wheel face 16. A further die block 140 abuts the outer face of the plate 134 so as to compress the latter against the block 130. A pair of slidable, removable core members 142, 144 extend through suitable openings in the blocks 130, 140 and plate 134, and meet at a plane 145 within the recess 131. The portions of the core members 142, 144 there exposed are contoured to provide the inner tubular surface of the desired bushing, and thus traverse the central opening 14 of the inserted wheel body, with the desired spacial clearance for the bushing wall to be cast.

The die assembly also includes projecting flanges to enter the grooves 17, 18 of the enclosed wheel body, one such annular flange 148 being integral with the core member 142 and the other flange 150 projecting from the plate 134. As shown, the core members and plate 134 thus provide a configuration which defines the ultimately exposed surface of the bushing to be cast. The edges of the flanges 148, 150 are adapted to bite into the bottoms of the grooves 17, 18, but with radially inward clearance of the groove wall, to provide for the skirts 25, 26.

The plate 134 has a groove 151 on its outer surface extending radially from the opening through which the core member 144 projects to a lower locality, where the groove 151 opens into a cylindrical cavity 152 which is closed at one end by a removable gate post member 153. The gate structure, for supply of metal under pressure, includes a passage 154 in the die block 140, opening to the space around a gate post 155 which projects through the cavity 152 from the end of the member 153, an annular recess being thus constituted around the post 155, in communication with the groove 151.

The core member 144 has an axially extending groove 157 which opens at one end to the groove 151 and at the other end, as shown, to the space around the core members in the opening of the wheel body 10. As will be seen, the block member 140 effectively closes the open side of the groove 151, the plate 134 similarly closing the open side of the groove 157, so that these grooves constitute a continuing passage for molten metal under pressure, from the gate structure to a locality in the mold cavity on the surface of the core. Molten metal under pressure may be supplied through a conduit 160 opening into the gate passage 154, from suitable means, which may be of conventional structure and hence are not shown. The several parts 130, 140, 142, 144 and 153 of the die assembly are preferably kept chilled, as by circulation of water through suitable passages, not shown.

In making the bushing, the wheel body 10 is inserted in the recesses 131, and the several elements are then closed together. More particularly, the block 140 is pressed directly against the core member 142 through the intermediate bodies of the plate 134 and the wheel 10; the opposite core member 144 is also pressed against the core member 142, and the die block 130 against the outer parts of the plate 134 and thus against the block 140. Molten metal under tremendous pressure and conveniently at the lowest temperature at which it can be displaced (e. g. at least not greatly above its melting point) is introduced through the passages 160 and 154, flowing thence along the passages 151 and 157 to the mold cavity (between the wheel body and the members 134, 144 and 142), which it fills practically instantaneously.

Thus the body of the metal is brought into precise configuration desired for the bushing, directly against the surfaces of the wheel structure 10 which are to be abutted and embraced. Heat is preferably continuously removed from the pressure-advanced metal en route to the mold cavity so that the metal solidifies practically as soon as it fills the cavity. The die parts are then opened and the wheel assembly removed. The bushing may be broken from the frozen supply line of metal, as at the junction of the grooves 151 and 157, and the rib of metal remaining from the short core groove 157 may be machined off.

Bushings so made fully embody the features of the present invention, i. e. constituting a practically integral unit of wheel body and bushing as shown in Figs. 1 to 4 and hereinabove described.

While other dimensions, shapes and materials (including other die casting alloys), may be employed in many cases, reference is made to certain specific examples of wheels that have been found successful. In such structures the wheel body was cut and finished from hard maple wood, to the precise shape and size desired for the outer surface 13, and likewise for the opening 14 (although it will be noted that in casting the bushing in place considerable tolerance is permissible for the size, shape and position of the opening 14). To suit skates commonly in use, the wheel body had an outside diameter of about 2⅜ inches, an altitude or axial length of about 1¼ inches, and a diameter of about 1 inch for the central opening, i. e. no greater and indeed slightly less than the axial extent of such opening. The grooves 17, 18 were recessed about ⅛th inch or so below the outer faces 15, 16, i. e. at least 1/16th inch (or preferably more), below the crown of the bead 19 or 20.

The cast body of metal constituting the bushing had a wall thickness throughout its tubular part and also throughout its flanges of about 0.04 inch, i. e. less than 1/16th inch, being thus a relatively thin structure, yet fully strong and effective as explained above. A thin wall for the bushing structure is believed to have substantial advantages both in manufacture and otherwise, a thickness of no more than about ⅛th inch being apparently preferable, at least throughout the tubular portion 22. It may be noted that in no instances of the improved wheel assemblies, made for example according to the operation illustrated in Fig. 8, could any charring or burning of the wood be detected, i. e. upon forcibly taking the structure apart for such examination. The chilling and removal of heat from the metal in die casting the described bushing can apparently be accomplished so rapidly and effectively (for example, in the operations set forth) as to avoid damage to the wood, even though the temperature of the molten metal is well above the charring or carbonization point of the wood.

It also appears important that the metal, e. g. the alloy, of which the bushing is made, be strong and durable, for example, such as one of the metals of moderate melting point now used for pressure or die casting under other circumstances, and especially as distinguished from relatively soft, so-called fusible metals, which might have heretofore been considered necessary (because of their very low melting points) in a situation involving contact of wood, i. e. heat-impaired material, with molten metal. Particularly good results, for instance, have been obtained with an alloy of the type known as "Zamak," these being alloys understood to consist chiefly of zinc, with aluminum and other metals such as copper and magnesium. For example, the specific alloy "Zamak 5" containing 95% zinc, 4% aluminum, 1% copper and 0.05% magnesium, M. P. about 715° F., has been used effectively, the temperature of the molten supply being kept at about 725° F. rather than 750° F. as normally recommended for such alloy. As indicated, the melting point of the metal of which the pressure-cast bushing is made does not need to be lower than the charring or carbonization point of wood such as constitutes the wheel body; on the contrary it appears that any of a variety of alloys, such as the above, having relatively high melting points, particularly alloys having good qualities for die casting and good hardness, tensile strength and like characteristics in the finished state may be employed, in signficant preference to soft, weak or brittle alloys of much lower melting point.

Wheel structures made in accordance with the principles herein set forth are not only practical and simple to manufacture, but are characterized by ruggedness and durability, without sacrifice of precision in size, shape, balance and other qualities essential to the true running of a roller skate wheel. The complete articles can be made in quantity at relatively low cost and are believed to satisfy a long-standing need, for the improvement of skate wheels and skate structures against the accidents and the frequent replacements that now occur.

It is to be understood that the invention is not limited to the specific devices herein shown and described, but may be carried out in other ways without departure from its spirit.

We claim:

1. In a skate wheel, in combination, a rigid, unitary wheel body of hard wood material having end faces and an axial opening intersecting said faces, and having an annular groove in each of said faces spaced radially from the opening, and a metallic bushing seated in the opening and having end flanges extending outwardly over the end faces and rearwardly in said grooves into engagement with the bottoms of the latter, said bushing consisting essentially of a body of metal pressure cast in place against the inner surface of the body opening and over the end faces and into the grooves, said wooden wheel body having the grain of its wood running essentially axially of said body, said annular groove having inner and outer concentric walls, the inner wall representing an annular surface progressively turned through at least about 90° from the corresponding end face of the body, said cast bushing being throughout an integrally cast body of strong metal having a melting point higher than the charring point of the wood, said bushing compressively engaging the inner surface of said opening, the end faces of the body intermediate the opening and the grooves, and the aforesaid inner wall and bottom of each groove, with strong compression characteristic of the body of metal pressure cast in place, said bushing including integrally cast bearing abutment means projecting inwardly of its central opening between the ends thereof, said bearing abutment means having a configuration provided by casting the metal between the opening of the body and two endwise abutting core members meeting centrally of the body and shaped to provide such configuration while being removable by sliding outwardly relative to the cast bushing, and said cast bushing having a wall thickness throughout the surface of the body opening, except at the locality of said abutment means, which is not more than $\tfrac{1}{16}$th inch.

2. In a skate wheel, in combination, a wheel body shaped of hard wood with the grain running essentially axially of said body, and having a configuration approximately equal to the solid defined by revolution of a rectangle about an axis parallel to and spaced externally from a longer side of said rectangle, said body thereby having a cylindrical outer surface, end faces, and a coaxial central opening, and said body having an annular groove in each of its end faces spaced radially from the opening, and a metallic bushing lining said opening and having end flanges overlying the end faces of the body and re-entrant, annular skirts projecting from the flanges and seated respectively in the aforesaid grooves, said bushing consisting essentially of a body of pressure cast metal having the aforesaid structure and intimately engaging and exactly conforming with the entire inner surface of the wheel body opening and the overlaid end face portions and the bottoms and radially inner sides of the grooves, said bushing engaging said body parts with the close intimacy and exerting between its end flanges and between its skirts and its opening-lining portion the strong compression which is characteristic of a metallic bushing of the described configuration pressure cast in the wheel body, of metal which shrinks, upon cooling, into such compressure engagement.

3. In a skate wheel, in combination, a wooden wheel body shaped from wood with the grain running essentially axially of the body, said body having end faces and a central, axially extending opening intersecting said faces, and a metallic bushing comprising a tubular portion seated in the opening and having end flanges overlapping portions of the end faces, said bushing consisting essentially of a body of cast metal intimately engaging the entire surface of the body opening and of the overlapped end face portions and said flanges compressively engaging the wheel body and thereby exerting compression of the latter endwise of its grain between them, said bushing having the intimate and compressive engagement with the wheel body as aforesaid, which is characteristic of a body of metal pressure cast in place, in the configuration of said bushing, said bushing being a single, integral, pressure casting of strong metal having a melting point higher than the charring point of said wood, and said bushing having a wall thickness substantially throughout, of not more than $\tfrac{1}{16}$th inch.

VICTOR J. BROWN.
HARRY C. COSTELLO.

REFERENCES CITED

The following references are of record in the file of this patent:

UNITED STATES PATENTS

| Number | Name | Date |
|---|---|---|
| 333,072 | House | Dec. 22, 1885 |
| 564,752 | Jamieson | July 28, 1896 |
| 833,763 | Titherington | Oct. 23, 1906 |
| 1,056,976 | Divine | Mar. 25, 1913 |
| 1,536,410 | Rockwood | May 5, 1925 |
| 1,664,296 | Hamerstadt | Mar. 27, 1928 |
| 1,673,405 | Davis | June 12, 1928 |
| 2,304,944 | Martinec | Dec. 15, 1942 |
| 2,440,650 | Batesole | Apr. 27, 1948 |

FOREIGN PATENTS

| Number | Country | Date |
|---|---|---|
| 686,516 | Germany | Dec. 14, 1939 |

OTHER REFERENCES

Chase, "Die Castings" (John Wiley and Sons, New York, 1934). (Copy in Division 3. See particularly pages 145 and 146.)